United States Patent

[11] 3,543,803

[72] Inventor Albert E. Chrow
       Chagrin Falls, Ohio
[21] Appl. No. 697,670
[22] Filed Jan. 15, 1968
       Continuation-in-part of Ser. No. 510,202,
       Nov. 29, 1965, Patent No. 3,445,583
[45] Patented Dec. 1, 1970
[73] Assignee Samuel Moore and Company
       Mantua, Ohio
       a corporation of Ohio

[54] COMPOSITE TUBING
       13 Claims, 8 Drawing Figs.
[52] U.S. Cl. .................................................. 138/103,
                                                                  174/47
[51] Int. Cl. ..................................................... F16l 55/00
[50] Field of Search ........................................ 138/138,
       122, 141, 103, 125, 118, 121, 130, 129, 140, 144,
                                                149, 154, 150; 174/47

[56]           References Cited
             UNITED STATES PATENTS
    646,887   4/1900  Stowe et al. ..................  174/47

|   |   |   |   |
|---|---|---|---|
| 837,512 | 12/1906 | Seeley ......................... | 138/138 |
| 3,211,823 | 10/1965 | Brown et al. ................ | 138/122X |
| 3,277,231 | 10/1966 | Downey et al. ............... | 174/47 |
| 3,300,571 | 1/1967 | Downey et al. ............... | 174/47 |
| 3,367,370 | 2/1968 | Sherlock ....................... | 174/47UX |

FOREIGN PATENTS

| 191,686 | 10/1956 | Austria ......................... | 138/138 |

Primary Examiner—Laverne D. Geiger
Assistant Examiner—Henry K. Artis
Attorney—Teare, Teare, & Sammon ABSTRACT: A composite tubing product for transmission of fluid under high pressure, including an inner polymeric core tube and an outer polymeric protective sheath surrounding the core tube. An electrical discharge element is disposed between the inner core tube and the outer sheath and extends in a spirally wound relation with respect to the axis of the core tube, and a particle penetration-resistant, envelopelike sleeve is disposed around the discharge element in engaged relation with the inner core tube.

Patented Dec. 1, 1970

3,543,803

INVENTOR.
ALBERT E. CHROW
BY
Teare, Teare & Sammon
ATTORNEYS 3,543,803

COMPOSITE TUBING

This application is a continuation-in-part of the copending U.S. Pat. application Ser. No. 510,202 to Albert E. Chrow, filed Nov. 29, 1965 now U.S. Pat. No. 3,445,583.

BACKGROUND OF THE INVENTION

The present invention relates in general to composite tubing for use in connection with mechanical devices for transmission of fluid under high pressure, and more particularly to tubing having an electrical discharge means, such as a metallic ground wire, incorporated therewith for use with fluid spray equipment or the like.

Composite tubing or hoses are used to transport a liquid such as paint or the like from a pulsating source of power such as a hydraulic pump to a spray nozzle, such as a spray gun or the like, where the liquid is sprayed upon an object. Because a considerable amount of static electrical charge is produced along the core of the hose, it is desirable to incorporate an electrically conductive ground wire in the structure of the hose so as to drain off such static charge to prevent sudden sparking at the spray nozzle. Such sparking occurs when too much electric static charge is built up in the device and a worker uses the spray nozzle too close to a grounded conductor, such as a steel beam. In order to transmit the liquid under sufficient pressure to produce an adequate spray, the hose is generally of a high pressure construction involving a relatively strong, though flexible inner tube or core, a fibrous reinforcement layer to protect against bursting, and an outer protective coating, usually polymeric, to protect the tubing from abrasion, moisture, temperature variations and corrosion. It is desirable that such hose radially expands under the pressure pulsations in order to act as an accumulator which attenuates the pulses so as to minimize the pulsating at the nozzle and thereby produce a more smooth and uniform painting spray. The practice in the past has been to incorporate this grounding wire as one of the braids of the reinforcement. In another form, the wire was molded into the core along one side thereof in a zigzag fashion. The difficulty with the prior art type of arrangement is that such wires often broke under pressure and thereby lost their effectiveness as a grounding device for a static charge. One attempt which had been made to solve the problem was to a make the hose less susceptible to expansion. Such approach was helpful in decreasing breakage of the wire but tended to make the hose less effective as it severely decreased in accumulator action and thus caused undesirable pulsation at the nozzle of the paint spray gun.

For an example of the prior art type devices, reference may be had to the U.S. Pat. No. 3,042,737 to Robert E. Brumback et al.

SUMMARY OF THE INVENTION

A composite tubing product comprising an inner polymeric core tube for transmitting fluid under pressure and an outer protective sheath surrounding the core tube. An electrical discharge means is disposed between the core tube and the protective sheath and is spirally wound with predetermined axial spaced pitch distances with respect to the axis of the core tube, and a particle-resistant or rupture-resistant envelopelike sleeve is disposed in encompassing relation around the discharge means in engaged relation with the inner core tube.

By this arrangement, there is provided an improved composite tubing product, including means for discharging or grounding an electrical charge produced upon use of the tubing which minimizes breakage or rupture of the electrical components upon pulsation or expansion of the tubing, which minimizes abrasion of the electrical components and provides a lubrication for the components upon pulsation or expansion of the tubing, which has good accumulator and fatigue failure characteristics, and which provides a simplified and efficient arrangement for maintaining the electrical conductivity and electrical discharge and/or grounding characteristics of the assembly.

BRIEF DESCRIPTION OF THE DRAWINGS

Referring now to the drawings.

Figure 1:
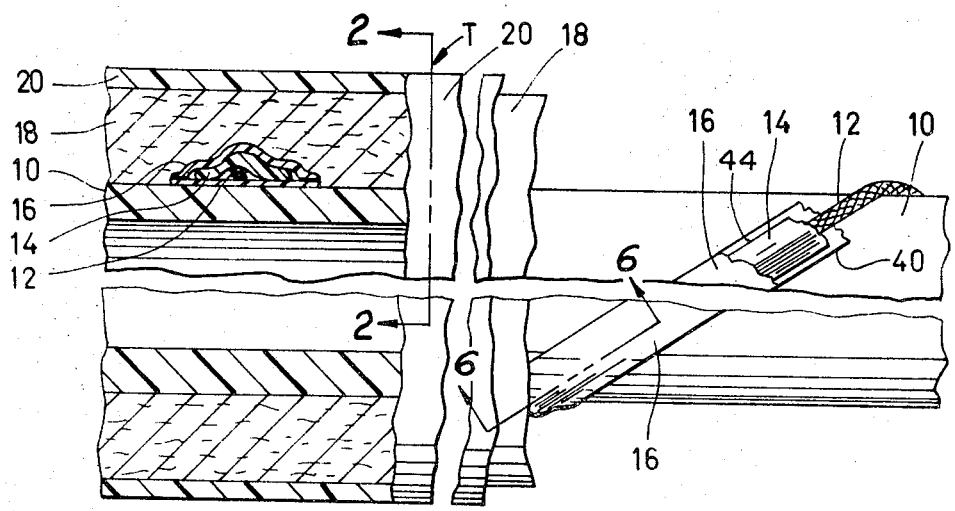
FIG. 1 is a fragmentary partially cut away and partially cross-sectioned elevation view of a section of paint hose according to the present invention.
Figure 2:
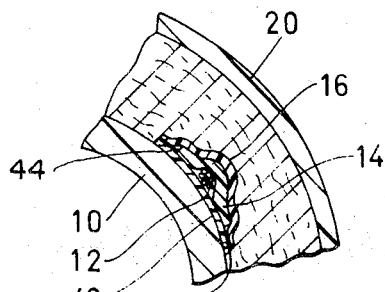
FIG. 2 is an enlarged fragmentary cross section of a composite paint hose taken along the lines 2–2 in FIG. 1.

Referring again to the drawings and more particularly to FIGS. 1 and 2 thereof, there is illustrated a composite tubing T made in accordance with the present invention and having an inner tube or core 10, a grounding element 12, such as a plurality of twisted wires, disposed helically of the inner tube 10 and covered by a binder tape 14 which in turn is covered by a protective tape 16. The binder tape 14 and protective tape 16 follow the helical convoluted path of the grounding element 12, as best illustrated in the right-hand portion of FIG. 1. A reinforcement sheath 18 of fibrous material may be disposed circumferentially of the tubing to reinforce the tubing for high-pressure operations and an outer protective sheath 20 may be disposed circumferentially of the reinforcement sheath to protect the composite product from corrosion, abrasion, and/or adverse temperatures.

Figure 4:
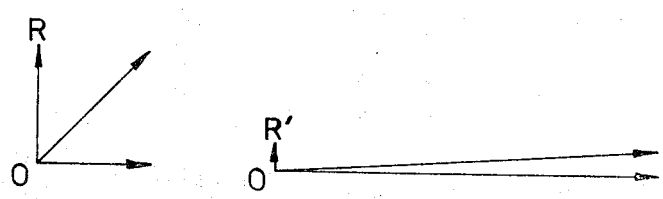
FIG. 4 is a vector diagram illustrating the forces exerted on a grounding element according to the prior art where the wire turns are closely spaced.
Figure 5:
FIG. 5 is a vector diagram illustrating the forces applied to the grounding element disposed according to the present invention.
Figure 3:
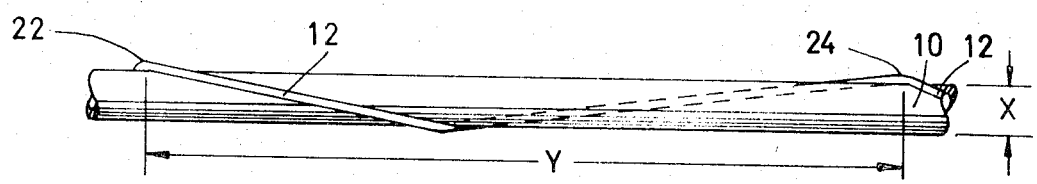
FIG. 3 is a fragmentary elevation view of a section of the inner core tube illustrating the grounding element or twisted wires, disposed spirally of the core tube in accordance with the present invention.

One feature of the invention is that the grounding element 12 may be wound helically of the inner tube 10 and in a manner so that the spacing between adjacent convolutions is much greater than ordinarily has heretofore been the case in the prior type of tubing. As shown in FIG. 3, it is desirable to wind the grounding element 12 so that the distance Y between corresponding axially spaced points on the convolutions, such as between crests 22 and 24, is at least four times the outer diameter of the inner tube 10. It is even preferred that the aforesaid pitch distance be 16 times the diameter of the tube. For example, where the diameter of the inner tube 10 is one-quarter inch, it is preferred that the pitch distance be 4 inches. It has been found that by greatly increasing the pitch distance, an extremely flexible hose construction may be utilized so as to permit substantial swelling or diametrical expansion of the hose so as to provide the desired accumulator action which minimizes the pulsation at the nozzle without subjecting the ground wire 10 to abnormal stresses and strains. It is preferred that the composite product expand as much as 11 percent of its diameter. The rupture of the grounding element 12 is caused by radially directed components of force. As shown in the vector diagram of FIG. 4, wherein a helical winding of the closely packed arrangement is made, the radial component 0 to R is substantial. In FIG. 4, as 45° lay is shown. In FIG. 5, it is seen that where the angle of the lay is extremely acute, the radially outwardly directed component of force 0 to R' is very slight as compared to its corresponding force shown in FIG. 4. It is to be understood that the angle of lay or the pitch distance may be more or less than that described but that the use of some pronounced elongation, as compared to the conventional tight winding, may be of great assistance in achieving the composite structure of the present invention.

While nylon is a preferred material for the construction of the inner tube and of the reinforcement sheath, it is to be understood that any materials which are strong enough to resist premature breaking, yet which are flexible enough to permit the expansion to achieve the accumulator effect may be used.

Figures 6, 7, 8:
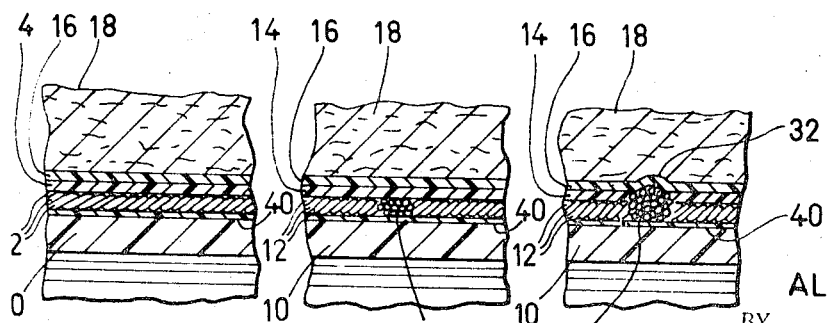
FIG. 6 is an enlarged fragmentary cross section taken along the lines 6–6 of FIG. 1, illustrating a cross section of the grounding element when assembled with the composite tubing and prior to rupture thereof.
FIG. 7 is an enlarged fragmentary cross-sectional sectional view illustrating a partial disintegration of the grounding element of FIG. 6 during operation.
FIG. 8 is a cross section illustrating the adjacent of the protective tape of FIGS. 6 and 7 after fragments break through the binder tape during operation.

Preferred results are obtained wherein the grounding element is comprised of a plurality of twisted wires. It is believed that a plurality of wires such as shown in FIGS. 6 to 8 is useful in achieving a disintegration of the grounding wire which, when used in cooperation with the other elements, retains electrical continuity as hereinafter described. Preferred results have been obtained by the use of a 8×2×34 AWG tinned copper, flattened braid, or the 8×2×34 AWG, bare oxygen-free copper.

The aforesaid axial disposition of the convolutions is utilized to minimize the occurence of breakage over normal usage. Equally important, it is designed to decrease the extent of breakage of the grounding element when it does occur. When this feature of a minimized extent of breakage is utilized in conjunction with the application of the binder tape 14 and the protective tape 16 of the present invention, the usefulness of the grounding element as a static energy dissipater is still available even though a rupture has occurred in the element. It has been found that the electrical conductivity of the grounding element may be sustained by confining the particles in sufficiently close physical proximity or contact with each other that the electrical conductivity is maintained even though a rupture has occurred and the element is no longer the continuous solid entity which it was during assembly.

The continuity of the electrical circuit is maintained by the disposition of a binder tape 14 which is placed over the grounding element 12, as shown in FIG. 1 and FIG. 2, so as to bind the element in position. The preferred binding tape should have good fatigue resistance and adhesive characteristics and good elongation. Preferably, the tape should be as wide as the grounding element which is covers and preferably, slightly wider. A preferred form of binder tape three-eighths inch wide by 4 mil thickness vinyl, such as type 471 sold by Minnesota Mining and Manufacturing Company. Other types of binding tapes may be utilized such as Mylar adhesive, semiplasticized vinyls, or various adhesive bearing thermoplastic or thermosetting resins as well as the use of impregnants such as latexes, plastisols, organisols, liquid urethanes, or epoxies. While it is not necessary to do so, the binder tape may completely cover the tube rather than merely following the path of the element, if desired. The tape must be capable of expansion so as not to be ruptured due to the action of the swelling or diametrical expansion of the tube due to the pulsation of the liquid therethrough and must be a sufficiently good binder to hold the fragmented particles 30 formed when a portion of the element ruptures, as shown in FIG. 7.

When the grounding element disintegrates after rupture, there is a possibility that one of the pieces or particles of the grounding element will break through the binder tape and cut the superimposed fibrous reinforcement sheet. Accordingly, a protective tape 16 may be provided to overlie the binder tape 14, as shown in FIG. 1. Thus, as shown in FIG. 8, should a rupture occur, the protective tape 16 shields the fibrous reinforcement 18 from the displaced grounding wire particles 32, thereby preventing abrasion, cutting or other damage to the reinforcement sheath and also confines the particles so as to maintain the electrical continuity of the grounding element. It is preferred that the protective tape follow the path of the convoluted wire. The tape could also be wound circumferentially of the binder tape and inner core so as to form a continuous encompassing sheath though such complete encasement is not necessary.

Now, in accordance with the invention, there is provided an inner or supportlike tape 40 which coacts with the protective tape 16 to form a conduit or confining envelope around and for the wire grounding element 12. As shown, the support tape 40 is disposed in engaged relation on the inner tube 10 and in a pattern corresponding to the lay of the element 12 and hence, the binder and protective tapes 14 and 16. Preferably, the support tape 40 is coextensive in width (FIG. 1) with that of the protective tape 16 and hence, slightly less than that of the binder tape 14. In this form, the outer confronting marginal edges of the support tape 40 and the protective tape 16 may be secured together, as at 42, to provide the envelopelike structure. This securement may be achieved, in the embodiment shown, by means of a heat seal along the opposed marginal edges or by means of a suitable adhesive of the type known in the art. By this arrangement, the inner support tape 40 coacts with protective tape 16 to provide an envelopelike enclosure around the grounding element tp to prevent any be breakthrough of the fragmented particles, as at 30, when a portion of the element ruptures, as discussed in connection with FIGS. 6 to 8. Accordingly, this construction affords an improved predetermined confinement of the material of the grounding elements so as to maintain the continuity of the electrical system to which the composite tubing may be applied. In addition, it will be seen that the support tape 40 provides an effective lubricated working surface upon which the grounding element 12 is mounted. Accordingly, the exposed confronting surface of the support tape 40 affords a working surface to enable free sliding movement of the grounding element 12 thereon which may result form expansion and/or flexure of the tubing, thereby to prevent breaks in the grounding element.

As best seen in FIG. 2, the respective superposed tapes 40, 14 and 12 provide a laminated construction, but with the grounding element 12 disposed in a snug fitting, sandwiched relation between tapes 40 and 14. Accordingly, the binder tape 14 being substantially free of securement to the protective tape 16 or the support tape 40 may move with respect thereto to accommodate expansion of the tube, as aforesaid. However, the binder tape 14 may have some limited securement adjacent its terminal or marginal edges, as at 44, due to the presence of the heat seal or adhesive material at the seam area 42.

In the invention, it is preferred that the protective tape 16 and the support tape 40 be made from an abrasion and particle penetration-resistant material. As an example, a preferred form of tape material is Mylar which is a polyethylene terephthalate polyester available from Dupont.

The outer reinforcement sheath of fibrous material may be of a conventional braid type or it may be of a series of coplanar layers. It is preferred that the braid material and construction be such as to permit sufficient diametrical expansion to act as an accumulator for the liquid, such as paint and the like, passing through the hose so that the pulsation at the nozzle of the spray gun is minimized. A preferred material for the reinforcement layer is nylon. However, other materials, such as dacron may be used. Dacron is the trade name of a polyester fiber sold by Dupont.

The thickness of the grounding element will depend on the degree of conductivity required. For example, where the hose is one-fourth inch in diameter, then it has been found desirable to use an element having a maximum initial resistance of 0.6 ohms for 25 linear feet of hose.

The outer protective sheath 20 may be of a polymeric material which provides flexibility, and good temperature and abrasion resistance. A preferred material for the sheath is polyurethane. The thickness may be in the range of 0.020 to 0.025 inch on a ¼-inch diameter inner core.

The foregoing composite structure for a paint hose and the like provides a hose which is capable of extreme radial outward expansion so as to provide an accumulator effect for paint and the like passing through the hose and thereby minimize pulsation at the nozzle while at the same time providing a grounding element to drain off static electricity to prevent sparking at the nozzle should the nozzle be placed in too close proximity to another conductor whereby the rupture-free life of the grounding element is greatly increased and whereby the electrical continuity and operation of the grounding element is maintained even though a rupture does occur and the fatigue life of the hose is increased.

Whereas the prior art structure, wherein the grounding element formed a part of the braid, lost electrical continuity at approximately 1,000 cycles, the structure of the present invention has operated from 50,000 cycles to in excess of 100,000 cycles without such loss.

The terms and expressions which have been used, are used as terms of description and not of limitation, and there is no intention in the use of such terms and expressions of excluding any equivalents of any of the features shown or described, or portions thereof, but it is recognized that various modifications are possible within the scope of the invention claimed.

I claim:

1. A composite tubing product for fluid pressure transmission comprising:
   an inner polymeric core tube for transmitting fluid under pressure;
   a reinforcement sheath of fibrous material disposed around said core tube;
   an electrical conductive element disposed in spirally would relation with respect to the axis of said core tube and disposed between said core tube and said reinforcement sheath;
   an inner support tape disposed in engaged relation between said core tube and said conductive element;
   an outer protective tape secured to said support tape on opposed sides of and in confining covering relation throughout the length of said conductive element to form an envelopelike sleeve around said conductive element to maintain electrical continuity upon expansion or flexure of said tubing; and
   said conductive element being disposed in movable relation within said sleeve to accommodate expansion of said tubing.

2. A composite tubing product in accordance with claim 1, wherein:
   said inner and outer tapes are made from a polymeric material;
   said inner and outer tapes being secured together adjacent their marginal edges; and
   said conductor element being disposed for sliding movement on said inner tape.

3. A composite tubing product in accordance with claim 1, including an intermediate binder tape disposed in covering relation between said conductor element and said outer protective tape.

4. A composite tubing product in accordance with claim 1, wherein said inner and outer tapes are substantially coextensive in width.

5. A composite tubing in accordance with claim 4, wherein said intermediate tape is of a lessor width as compared to said inner and outer tapes, and has a width sufficient to cover said conductor element.

6. A composite tubing product in accordance with claim 1, wherein said inner and outer tapes are made from a polymeric material.

7. A composite tubing product in accordance with claim 1, wherein the pitch distance between adjacent convolutions of said conductor element is greater than the diameter of said inner core tube.

8. A composite product in accordance with claim 1, including an outer polymeric protective sheath disposed around said reinforcement sheath.

9. A composite tubing product in accordance with claim 1, wherein said sleeve comprises a polymeric laminatelike structure, and said conductor element disposed in sandwiched relation within said structure.

10. A tubing product in accordance with claim 3, wherein said binder tape is substantially free of securement with respect to said outer tape and said inner tape to enable movement with respect thereto to accommodate expansion of said tubing.

11. A tubing product in accordance with claim 1, wherein:
    said inner and outer tapes are made of a polymeric material; and
    said inner tape has greater abrasion resistant characteristics as compared to said outer tape.

12. A composite tubing product in accordance with claim 1, wherein said inner tape is made of a polyethylene terephthalate polyester.

13. A composite tubing product having good burst strength, fatigue, diametrical expansion and electrical continuity characteristics for use in transmitting pressurized pulsating fluid comprising:
    an inner polymeric core tube having an axially extending bore for the transmission of said fluid;
    a continuous electrical conductive element disposed in helically convoluted relation around said core tube and substantially coextensive in length with said tubing;
    a reinforcement sheath of fibrous material disposed in circumferentially engaged relation around said core tube;
    an abrasion resistant inner support tape disposed in secured relation to said core tube and in engaged relation to said conductive element;
    an outer protective tape secured to said support tape on opposed sides of said conductive element throughout the length thereof to form an envelopelike sleeve around said conductive element; and
    an intermediate binder tape disposed in engaged relation with said support tape and in engaged confining covering relation throughout the length of said conductive element between said conductive element and said outer protective tape to maintain the electrical continuity of said conductive element.